US009293792B2

(12) United States Patent
Grace et al.

(10) Patent No.: US 9,293,792 B2
(45) Date of Patent: Mar. 22, 2016

(54) SELF-ACTIVATED DRAINING SYSTEM (71) Applicant: Tesla Motors, Inc., Palo Alto, CA (US)

(72) Inventors: Dustin Grace, San Carlos, CA (US);
Mark Goldman, Mountain View, CA (US); Woodruff Phillips, Redwood City, CA (US); Dorian W. West, Menlo Park, CA (US); Paul Guerra, Mountain View, CA (US); Angus W. Rittenburg, Perkasie, PA (US); Ganesh Singh, Westbloomfield, MI (US); Kevin Anderson, Mountain View, CA (US); Adam Horton, San Francisco, CA (US); Peter How, Sunnyvale, CA (US); Christopher J. Stoffel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 261 days.

(21) Appl. No.: 13/891,580

(22) Filed: May 10, 2013

(65) Prior Publication Data

US 2014/0332085 A1     Nov. 13, 2014

(51) Int. Cl.
*F16K 17/40*     (2006.01)
*H01M 10/42*     (2006.01)
(Continued)

(52) U.S. Cl.
CPC ............ *H01M 10/4228* (2013.01); *H01M 2/36* (2013.01); *H01M 10/5004* (2013.01);
(Continued)

(58) Field of Classification Search
CPC .................... H01M 10/4228; H01M 10/5004; H01M 10/5075; H01M 10/6567; H01M 10/613; H01M 2/36; H01M 2220/20; Y10T 137/0324; Y10T 137/5762; Y10T 137/1782; Y10T 137/1624; Y10T 137/1639; Y10T 137/1812
USPC .......... 137/70, 68.12, 68.18, 74, 312; 251/62, 251/63, 67; 429/82, 120
See application file for complete search history.

(56) References Cited

U.S. PATENT DOCUMENTS 2,985,180 A * 5/1961 Grayson ......................... 137/74
3,406,827 A * 10/1968 Topol et al. .................. 210/96.1
(Continued)

FOREIGN PATENT DOCUMENTS

JP     2008-270134     11/2008
JP     2011-173447     9/2011
(Continued)

OTHER PUBLICATIONS

International Application No. PCT/US2014/037438, International Search Report dated Sep. 26, 2014, 5 pages.
(Continued)

*Primary Examiner* — Mary McManmon
*Assistant Examiner* — Minh Le
(74) *Attorney, Agent, or Firm* — J. Richard Soderberg (57) ABSTRACT A method of managing leakage of liquid inside a battery system comprises: containing leaking liquid in a non-liquid sensitive region of the battery system so as to protect internal electrical components of the battery system from coming in contact with the leaking liquid; and in direct response to the leakage, expunging the leaking liquid from the battery system. A drain device includes: a body with a port therethrough, the body configured to be positioned in a wall of a container; means for opening the port in response to a first liquid contacting the drain device on an inside of the container; and means for resisting ingress into the container by a second liquid that contacts the drain device on an outside of the container.

24 Claims, 11 Drawing Sheets (51) Int. Cl.
*H01M 2/36* (2006.01)
*H01M 10/613* (2014.01)
*H01M 10/6567* (2014.01)

(52) U.S. Cl.
CPC ........ *H01M10/5075* (2013.01); *H01M 10/613* (2015.04); *H01M 10/6567* (2015.04); *H01M 2220/20* (2013.01); *Y10T 137/0324* (2015.04); *Y10T 137/5762* (2015.04)

(56) References Cited

U.S. PATENT DOCUMENTS

| | | | | |
|---|---|---|---|---|
| 3,460,993 | A * | 8/1969 | Saunders et al. | 429/63 |
| 4,231,384 | A * | 11/1980 | Christensen | 137/62 |
| 4,365,643 | A * | 12/1982 | Masclet et al. | 137/70 |
| 5,015,843 | A | 5/1991 | Seitz et al. | |
| 5,511,576 | A * | 4/1996 | Borland | 137/72 |
| 5,579,815 | A * | 12/1996 | Labonte | 141/384 |
| 5,632,297 | A * | 5/1997 | Sciullo et al. | 137/73 |
| 6,006,774 | A * | 12/1999 | Lhymn et al. | 137/72 |
| 6,756,151 | B2 * | 6/2004 | Zhou et al. | 429/86 |
| 6,814,097 | B2 * | 11/2004 | Girouard | 137/72 |
| 7,572,161 | B2 | 8/2009 | Mackal et al. | |
| 8,919,367 | B2 * | 12/2014 | Dombrowski | 137/15.08 |
| 8,925,567 | B2 * | 1/2015 | Schulze | 137/74 |
| 8,944,087 | B2 * | 2/2015 | Thyroff et al. | 137/68.11 |
| 2003/0024567 | A1 * | 2/2003 | Spriegel et al. | 137/62 |
| 2004/0238031 | A1 * | 12/2004 | Lee | 137/74 |
| 2009/0181269 | A1 | 7/2009 | Unoki et al. | |
| 2010/0078078 | A1 * | 4/2010 | Daido et al. | 137/72 |
| 2010/0116363 | A1 | 5/2010 | Na et al. | |
| 2011/0174556 | A1 | 7/2011 | Hermann et al. | |
| 2011/0206969 | A1 | 8/2011 | Tennessen et al. | |
| 2011/0296855 | A1 | 12/2011 | Johnston et al. | |
| 2012/0164545 | A1 | 6/2012 | van Rensburg et al. | |
| 2012/0231306 | A1 | 9/2012 | Herron et al. | |
| 2012/0273050 | A1 * | 11/2012 | Metzger et al. | 137/2 |
| 2014/0190568 | A1 * | 7/2014 | Phlegm et al. | 137/1 |

FOREIGN PATENT DOCUMENTS

| | | |
|---|---|---|
| JP | 2011-195069 | 10/2011 |
| KR | 10-2012-0069238 | 6/2012 |

OTHER PUBLICATIONS

Wikipedia entry re Dissolution http://en.wikipedia.org/w/index.php?title=Dissolution_(chemistry)&oldid=474194374, (Jan. 2012).

* cited by examiner

SELF-ACTIVATED DRAINING SYSTEM

BACKGROUND

Active battery cooling can be used to reduce thermal runaway risk and optimize battery performance and lifetime. Some active battery cooling systems blow air across the cells, or across a radiator that is thermally coupled to the cells. As another example, a battery cooling system can use cooling tubes and a liquid coolant to withdraw heat from the cells. Care must be taken to ensure that the liquid coolant does not short or otherwise electrically interfere with the batteries.

The loss of containment of coolant inside of a high voltage battery (either by system failure or abuse) can lead to an unsafe situation. When a battery is mounted in an electric or hybrid vehicle, the inherent risk of mechanical damage to the battery (e.g., in a vehicle crash) can pose an increased likelihood of unwanted leaks of liquid coolant. If the cooling system becomes punctured and liquid coolant spreads elsewhere in the battery, this can lead to significant adverse consequences for the battery and the entire vehicle.

For example, when directly exposed to conductive coolant or liquid, a high voltage battery can experience loss of isolation, high voltage shorting and arcing, and hydrogen generation. Any or all of these can ultimately lead to an explosion or fire. That is, internal electrical components of a high-voltage battery should be protected from immersion, splash, contact or spray, in case an internal cooling system fails or is damaged from fatigue, faulty components, or crash/abuse.

In the past, an electric fluid sensor has been used to detect leaked coolant. However, such a sensor does not itself remove any liquid from the battery pack. Upon or after leakage, a skilled technician can drain a battery pack of leaking coolant. However, this requires expert knowledge and some external indication of the leak.

SUMMARY

In a first aspect, a drain device includes: a body with a port therethrough, the body configured to be positioned in a wall of a container; means for opening the port in response to a first liquid contacting the drain device on an inside of the container; and means for resisting ingress into the container by a second liquid that contacts the drain device on an outside of the container.

Implementations can include any or all of the following features. The means for opening the port and the means for resisting ingress comprise: a valve member extending at least partly through the port, the valve member configured to assume at least a first position in which the port is closed, and a second position in which the port is open; a biasing element that biases the valve member toward the second position; and a dissolvable element that prevents the valve member from assuming the second position, wherein when the first liquid contacts the dissolvable element, the first liquid at least partly dissolves the dissolvable element and the valve member assumes the second position. The means for opening the port and the means for resisting ingress comprise a deformable member, wherein the dissolvable element causes elastic deformation of the deformable member to block the valve member from assuming the second position, and wherein when the liquid at least partly dissolves the dissolvable element the elastic deformation is reversed so that the valve member assumes the second position. The drain device further includes an O-ring on at least one of the valve member and the body, wherein in the first position the O-ring seals between the valve member and the body, and in the second position the O-ring does not seal between the valve member and the body. The means for opening the port and the means for resisting ingress comprises a dissolvable membrane covering the port. The means for opening the port and the means for resisting ingress comprise a dissolvable pin that, in a non-dissolved state maintains a seal of the port, and that in a dissolving state causes the port to be opened. The means for resisting ingress comprises a seal on a valve member through the port, and wherein the means for opening the port comprises a dissolvable washer that, in a non-dissolved state maintains the seal, and that in a dissolving state causes the port to be opened. The dissolvable washer is threaded and fitted onto the valve member. The means for opening the port comprises at least one floating ball inside the wall. The means for resisting ingress also comprises the floating ball, and wherein the floating ball is held against the port by a dissolvable member. The means for resisting ingress comprises at least one floating ball outside the wall. The means for opening the port comprises an absorbing material that, in a non-expanded state maintains a seal of the port, and that in an expanded state causes the port to be opened. The means for resisting ingress comprises a membrane, and wherein the means for opening the port further comprises a needle that at least partially pierces the membrane when the absorbing material assumes the expanded state.

In a second aspect, a system comprises: a battery system; a cooling system configured to cool at least part of the battery system with a liquid coolant; and a self-activating drain device in an exterior wall of the system, the self-activating drain device comprising: a body with a port therethrough; a valve member configured to assume at least open and closed positions, the valve member biased toward the open position; and a dissolvable element that prevents the valve member from assuming the open position, wherein when the liquid coolant contacts the dissolvable element, the liquid coolant at least partly dissolves the dissolvable element and the valve member assumes the open position.

Implementations can include any or all of the following features. The self-activating drain device further comprises a deformable member, wherein the dissolvable element causes elastic deformation of the deformable member to block the valve member from assuming the open position, and wherein when the liquid coolant at least partly dissolves the dissolvable element the elastic deformation is reversed so that the valve member assumes the open position. The system further comprises an O-ring on at least one of the valve member and the body, wherein in the first position the O-ring seals between the valve member and the body, and in the second position the O-ring does not seal between the valve member and the body.

In a third aspect, a method of managing leakage of liquid inside a battery system comprises: containing leaking liquid in a non-liquid sensitive region of the battery system so as to protect internal electrical components of the battery system from coming in contact with the leaking liquid; and in direct response to the leakage, expunging the leaking liquid from the battery system.

Implementations can include any or all of the following features. The method further comprises: generating a leakage detection signal in direct response to the leakage. The method further comprises: performing at least one action in response to the leakage detection signal. The action is performed in the battery system.

DETAILED DESCRIPTION

This document describes systems and techniques for managing an undesirable presence of liquid in a battery system. In general, a system is furnished that is configured to contain leaking liquid in a non-liquid sensitive region of the battery system so as to protect internal electrical components of the battery system from coming in contact with the leaking liquid. The system also expunges, in direct response to the leakage, the leaking liquid from the battery system.

A passive drain comprises a self-activating valve having a dissolvable element that reacts to the liquid(s) and causes the valve to be opened. Before activation (opening), the valve is closed and prevents passage of any substances into or out from the battery system. Upon activation, the valve allows the leaking fluid to drain out of the enclosure. Some implementations are configured to contain internal coolant leaks in the battery system, expunge at least some of the coolant via the passive drain, and detect and report to a battery management system that such an event has occurred. For example, upon detection of such an event, coolant pumps can be deactivated, warning can be given to the user, and/or vehicle behaviors can be enacted to maximize safety.

Figure 1:
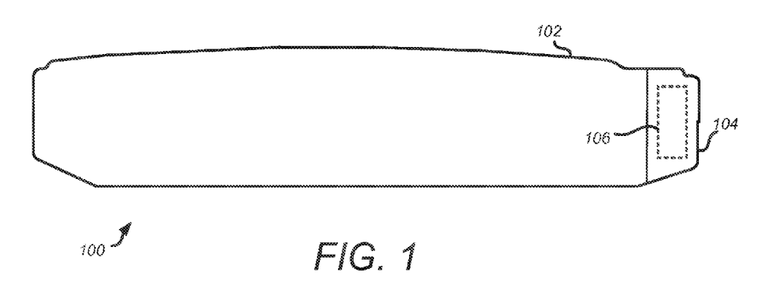
FIG. 1 schematically shows a cross section view of an example of a battery system.

FIG. 1 schematically shows an example of a battery system 100. In some implementations, the battery system is implemented to power a vehicle. For example, the battery system can provide energy to one or more motors for propelling an electric or hybrid car. Here, the battery system has a generally flat shape for being mounted in the bottom of the vehicle, and is currently shown from the side.

The battery system can contain one or more individual cells. The individual cells are electrically interconnected to achieve the desired voltage and capacity for a particular application. For example, a number of cells can be organized in a battery pack compartment, and multiple battery pack compartments can be arranged to form the battery system 100.

A cell can include any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or lead acid, to name just a few examples.

In this example, the cells are located in a region 102 of the battery system 100. The region 102 is sometimes referred to as a "dry zone," because the cells should generally be kept free from liquid or moisture to avoid electrical malfunction. That is, the dry zone here refers to the area within the battery that is sensitive to liquid and where contact with coolant should be prevented. This dry zone can include components and/or circuitry that controls the operation of the battery system (e.g., a battery management system). In contrast, one or more regions 104 are sometimes referred to as a "wet zone," because such region houses a cooling system that uses liquid coolant to remove heat from the cells in the dry zone. That is, the wet zone here refers to the contained area within the battery that is generally not sensitive to liquid and in which a flood event will not cause an electrical hazard or trigger the generation of hydrogen.

In the following, examples of valve drains and other flood ports will be described. The dry zone is also a region where the drain/port will not be activated, because the dry zone is isolated to the wet zone. In an example system (such as battery system 100) potential failure points of the cooling system are contained within the wet zone. Points that are vulnerable to crash abuse include, but are not limited to, brazed and clamped joints, and the manifold.

The battery system 100 has a cooling system 106 (schematically shown) that can include a pump and one or more ducts or other conduits where the liquid coolant flows. For example, the duct(s) can run alongside and/or otherwise in between or around the cells, in order that heat can flow from the cells into the liquid coolant. At one or more places of the cooling system, the coolant is chilled to a lower temperature (i.e., thermal energy is removed from the coolant), thereby increasing its ability to absorb heat from the cells. Any suitable type of liquid coolant can be used. The coolant can be selected based on its thermal capacity, viscosity, cost, toxicity, and/or chemical inertia, to name just a few examples.

However, while the liquid coolant should absorb thermal energy from the cells, the liquid coolant should be kept contained in the cooling system and not come in contact with the cells or any other circuitry in the battery system. The container that houses the cooling system 106 therefore has one or more valves configured to self-activate (e.g., open) if coolant should be released inside the container. For example, if the cooling system should leak liquid coolant (e.g., due to a rupture or other malfunction) the coolant would collect inside the container and the valve should then open itself to allow (at least part of) the coolant to escape outside the battery system.

Figure 2:
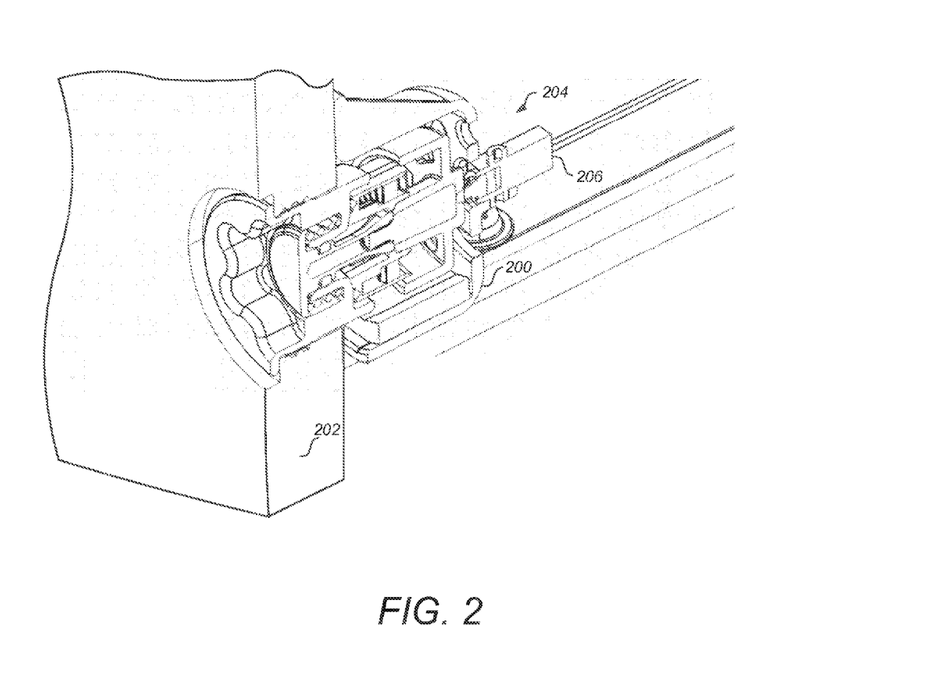
FIG. 2 shows a cross section view of an example valve in the battery system.

FIG. 2 shows a cross section view of an example valve 200 in the battery system. A battery enclosure 202 contains the entire battery system, in some implementations. For example, the battery enclosure encompasses the dry zone 102 in FIG. 1. Particularly, the battery enclosure forms a container 204 that in this example houses the cooling system. In the event of leakage, the container can serve as a coolant collection basin. That is, the system contains leaking liquid in a non-liquid sensitive region of the battery system, which can protect internal electrical components of the battery system from the leaking liquid. In direct response to the leakage, the system then expunges the leaking liquid.

A detector 206 can be provided on or near the valve 200 to detect the activation. The detector can perform detection in one or more ways, for example using a switch that closes (or is opened) by the movement of some component of the valve. As another example, the detector can use chemically and/or electrically sensitive components that register the presence of the liquid.

Figures 3, 4:
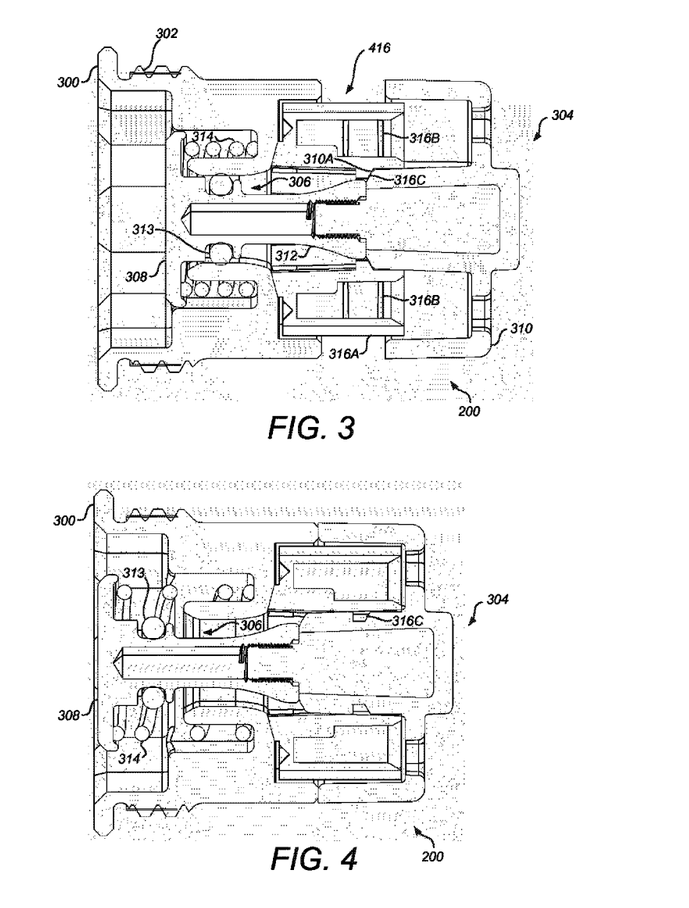
FIGS. 3-4 show cross section views of the valve in FIG. 2 in non-activated and activated states, respectively.

FIGS. 3-4 show cross section views of the valve 200 in FIG. 2 in non-activated and activated states, respectively. The valve includes a body 300 that is configured to be positioned in a wall of a container. In some implementations, the body has threads 302. The body can be mounted in the wall of the container 202 (FIG. 2) using threads or a friction fit, to name just two examples.

The valve 200 includes a valve member 304 that extends at least partly through a port 306 of the body 300. The port is one or more channels in the valve that if not blocked will allow liquid to pass through the valve. The valve member includes a disc 308 and an opposing end 310 connected by a stem 312. An O-ring 313 is here mounted on the stem 312. The O-ring currently seals the port against liquid flow.

The valve member can be manufactured from any suitable material such as, but not limited to, plastic or metal. In some implementations, the disc and the stem together form one part of the valve member, and the opposing end forms another part of the valve member. For example, these parts can be joined to each other using threads on at least one of the parts (here, the opposing end has external threads that match internal threads on the stem.)

A spring 314 is currently compressed (fully or partially) between the disc 308 and a portion of the body 300. That is, the spring 314 has mechanical energy stored therein because it is currently not possible for the valve member 304 and the body to move relative to each other. The valve 200 is sometimes said to be in a non-activated state at this point, because it has not self-activated (e.g., opened) yet.

The prevention of relative motion between the valve member 304 and the body 300 results from the presence of a deformable member 316 in the valve 200. The deformable member here includes a structural piece 316A and a dissolvable element 316B. Particularly, the dissolvable element 316B currently deforms the structural piece so that one or more tabs 316C on the structural piece abuts one or more flanges 310A on the opposing end 310. The contact between the tab(s) and the flange(s) currently prevents the valve member 304 and the body 300 from moving relative to each other. That is, the mechanical energy currently remains stored in the spring 314 because of how the dissolvable element deforms structural piece, and the current position of the valve member maintains the port sealed (by the O-ring 313). The valve 200 therefore resists ingress of liquid from the outside into an enclosure.

The dissolvable element 316B can be made from any suitable material that will at least partly dissolve when it comes in contact with the particular liquid used in the system. In some implementations, the dissolvable element can have a crystalline structure that upon contact with the liquid disintegrates into ions, atoms and/or molecules. For example, a water-soluble material (e.g., sugar) can be used when the coolant includes water.

Assume now that the valve 200 comes into contact with the liquid(s), perhaps due to an inadvertent leak of liquid coolant. As the dissolvable element 316B begins to dissolve, the deformation of the structural piece 316A begins to change. In some implementations, the dissolvable element initially causes an elastic deformation of at least part of the structural piece (e.g., a part that contains the tab 316C), and such deformation can then be fully or partially reversed when the element dissolves.

FIG. 4 shows an example of the valve 200 after the valve has self-activated. That is, the dissolvable element has (at least partially) dissolved such that the relative motion is no longer prevented by the tab(s) 316C. As a result, the spring 314 has returned to a relaxed (in this example, longer) state and in doing so has caused the valve member 304 and the body 300 to move relative to each other. Particularly, the O-ring 313 no longer seals between the valve member and the body. The port 306 is therefore no longer blocked and the liquid can therefore pass through the open valve. That is, the dissolvable element 316B causes the port 306 to open in response to liquid contacting the valve on the inside of the container.

Referring again to FIG. 2, the detector 206 can generate one or more signals upon self-activation by the valve 200. In some implementations, the detector generates a signal to a remote system (e.g., a battery management system). Such signal(s) can be used for one or more purposes. For example, and without limitation, a pump of a cooling system can be switched off or at least partly de-energized. This can reduce the amount of liquid being leaked and can help mitigate the unwanted consequences. As another example, a user alert can be generated (such as an audio and/or visual signal.) As another example, the behavior of a vehicle that contains the battery system can be modified (such as by turning off a motor of the vehicle and/or switching to another mode of propulsion.)

Figure 5:
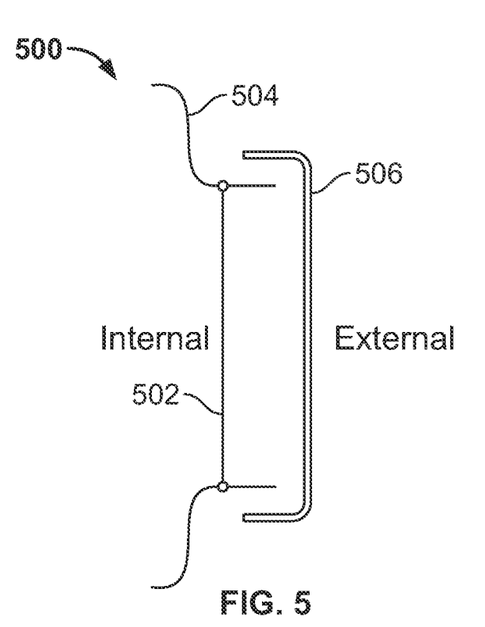
FIG. 5 shows an example of a vent having a dissolving membrane.

FIG. 5 shows an example of a vent 500 having a dissolving membrane 602. Here, the vent is mounted in a wall 504 (partially shown, in cross section), such as the wall of a battery pack, to separate an internal region thereof from an external region. The dissolving membrane can be manufactured from any suitable material(s) that will completely or partially dissolve on contact with the type(s) of coolant being used. In some implementations, a porous plug can be used. The membrane permits passage of gas (e.g., air) but not a liquid (e.g., water). On contact with battery coolant, a dissolution or other chemical reaction can occur, allowing the membrane (or plug) to disappear and the coolant to drain. For example, and without limitation, the coolant can have a caustic additive that attacks the vent material (e.g., the dissolving membrane) but does not attack one or more other materials (e.g., the interior surface of the battery pack). That is, the dissolving membrane resists liquid ingress from the outside and opens a port in the container wall in response to a liquid contacting the drain on the inside.

In some implementations, a shield 506 can be provided outside the vent. For example, the shield can prevent dust, other particles or solid objects from inadvertently puncturing or otherwise adversely affecting the dissolving membrane 502.

Figure 6A:
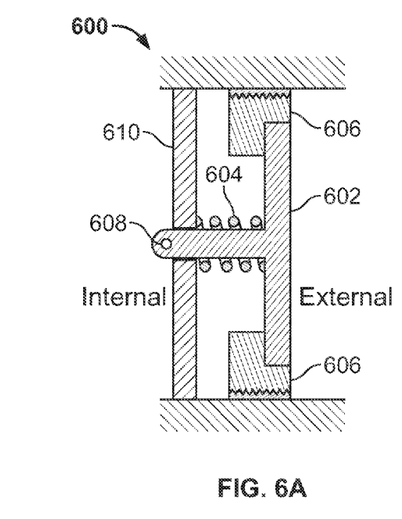
FIGS. 6A-B show an example of a vent having a plunger cap.
Figure 6B:
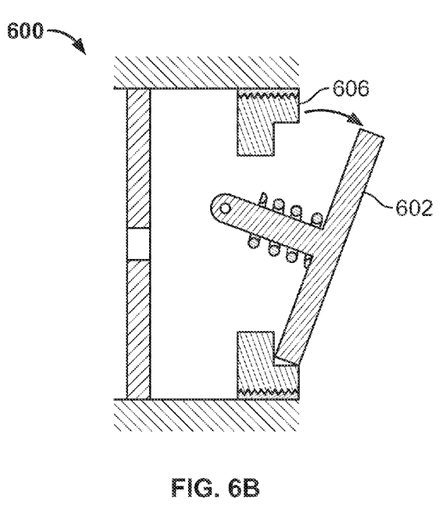

FIGS. 6A-B show an example of a vent 600 having a plunger cap 602. The vent and/or the plunger cap can be manufactured as one or more integral pieces from any suitable material. For example, and without limitation, the vent and/or cap can be molded or machined from metal or a polymer. The vent can be mounted in the wall of any suitable type of container, such as a battery pack.

The plunger cap 602 is spring loaded using a spring 604. In some implementations, another type of biasing member can be used, such as a blade spring or an elastically compressible material. The plunger cap is currently positioned against a seat 606, thereby separating an internal region of the container from an external region thereof. A fuse pin 608 is attached to the plunger cap and currently prevents an interior wall 610 of the container from releasing the plunger cap. Particularly, the fuse pin blocks a member of the plunger cap from completely passing through an opening in the interior wall. That is, the spring has energy stored therein while the fuse pin holds the plunger cap in place against the seat. The fuse pin and the plunger cap resist liquid ingress from the outside.

On contact with one or more liquids (e.g., leaking coolant), the fuse pin 608 can release or break or dissolve. In some implementations, heat (e.g., from a fire) can have a similar effect on the fuse pin. FIG. 6B shows that the partial or full disappearance of the fuse pin causes the plunger cap 602 to cease engaging the seat 606. This can allow a liquid in the interior to be drained. That is, the fuse pin and the plunger cap open a port in the container wall in response to a liquid contacting the drain on the inside.

In some implementations, the fuse pin can be wired to a voltage such that the closing of a switch upon contact with the coolant causes the pin to fail. For example, the switch can assume an "on" position when immersed in conductive coolant.

Figure 7:
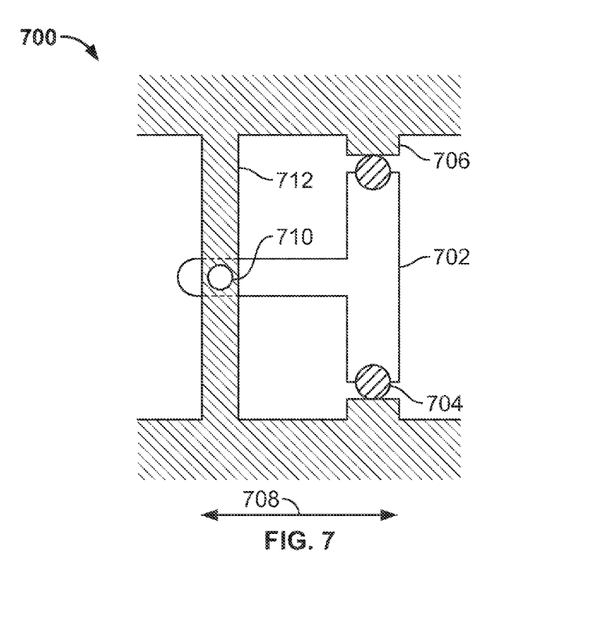
FIG. 7 shows an example of a vent having a vent cap.

FIG. 7 shows an example of a vent 700 having a vent cap 702. A gasket 704 can form a seal between the vent cap and a remainder of the vent, such as with one or more seats 706. The vent cap is manufactured from a mass of some material (e.g., metal) such that the vent cap is brought loose by inertial forces upon an external event (e.g., a collision of the vehicle in which the vent is mounted, as schematically indicated by a crash motion arrow). Particularly, a frangible pin 708 causes the vent cap to hold its current position. For example, the frangible pin can be fractured by the external event, allowing any leaking coolant to drain. The fuse pin and the plunger cap resist liquid ingress from the outside and open a port in the container wall in response to an external event that may cause leakage on the inside.

Figure 8A:
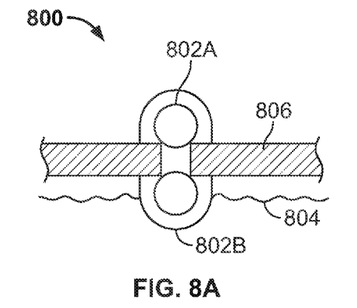
FIGS. 8A-B show an example of a drain valve having two floating balls.
Figure 8B:
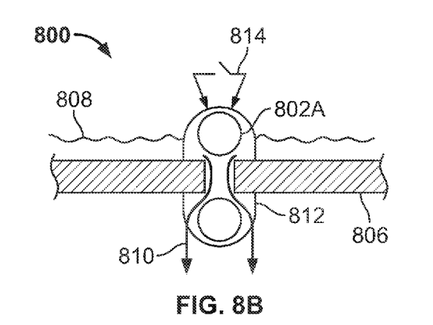

FIGS. 8A-B show an example of a drain valve 800 having two floating balls 802A-B. In some implementations, a valve has two floating balls in series to drain an enclosure (e.g., a battery pack) that has been flooded. In short, the drain valve allows a flooded enclosure to drain, while sealing the enclosure against liquid ingress. The floating ball can be manufactured from any suitable material that will allow the ball to float (i.e., to be buoyed) due to the presence of liquid, including, but not limited to, polystyrene or other plastic, wood or other natural material, or a hollow metal or plastic sphere.

One of the balls (e.g., ball 802B) is outside the enclosure. The drain valve can also seal the enclosure from ingress of water or other contaminants. For example, if a liquid level 804 appears outside the enclosure (e.g., due to submersion), the liquid will bias the floating ball 802B against a wall 806, thereby sealing or blocking a channel to the inside. That is, the floating ball 802B resists liquid ingress from the outside.

The other ball (e.g., ball 802A) is inside the enclosure. For example, as shown in FIG. 8B, if a liquid level 808 appears inside the enclosure (e.g., due to coolant leak), the liquid will bias the floating ball 802B away from the wall 806, thereby opening a channel to drain the liquid through the drain valve 800, as schematically indicated by arrows 810. A cage 812 can be provided on the inside and/or outside of the drain valve, for example to maintain the floating ball(s) in position to close off the drain. That is, the floating ball 802A opens a port in the container wall in response to a liquid contacting the drain on the inside.

A switch 814 can be provided with the drain valve 800. In some implementations, the switch can be activated (i.e., change into an on or off state) upon the ball 802A floating upward in the cage 812. For example, the switch can trigger one or more actions such as, but not limited to, disengaging a pump for liquid coolant.

Figure 9:
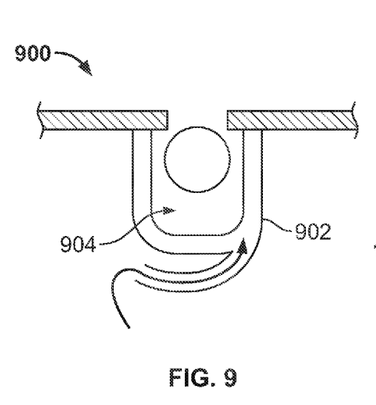
FIG. 9 shows an example of a valve having a protective cover.

FIG. 9 shows an example of a valve 900 having a protective cover 902. The protective cover has one or more fluid paths 904 to a floating ball. The protective cover can be positioned on the outside of the valve, such as to provide a tortuous path for liquid that approaches the valve from the outside. For example, the protective cover can prevent debris and liquid splashes from entering the valve.

Figure 10:
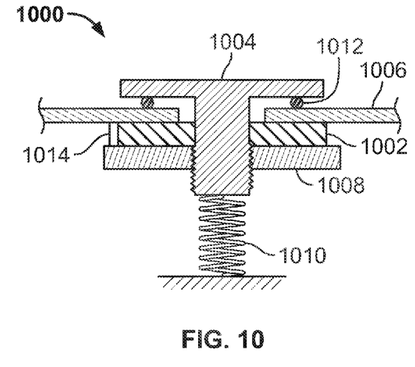
FIG. 10 shows an example of a valve with a dissolving washer.

FIG. 10 shows an example of a valve 1000 with a dissolving washer 1002. Particularly, a valve member 1004 passes through a wall opening in a container 1006, and the dissolving washer is biased against the container by a nut 1008. In some implementations, a spring 1010 biases the valve member away from the opening. The other end of the spring abuts a rigid surface. A seal 1012 is positioned between the valve member and the opening in the container. The nut 1008 is here wider than the wall opening in the container 1006. In other implementations, the nut may be narrower.

If the dissolving washer 1002 is contacted by a liquid (e.g., leaking coolant), it will dissolve fully or in part, and this allows the valve member 1004 to be moved relative to the container 1006 such that the seal 1012 no longer prevents fluid passage. That is, upon the valve member being repositioned, the liquid can drain out of the container. The seal, valve member and dissolvable washer resist liquid ingress from the outside, and open a port in the container wall when liquid contacts the valve on the inside.

The valve 1000 can have at least one frangible pin 1014. In some implementations, the frangible pin can share the load with the dissolving washer 1002 before activation of the valve; that is, while the valve is sealing against liquid. For example, this can prevent creep before the valve is activated, but can allow the valve to open (e.g., fracturing the pin) in case the washer dissolves.

Figure 11:
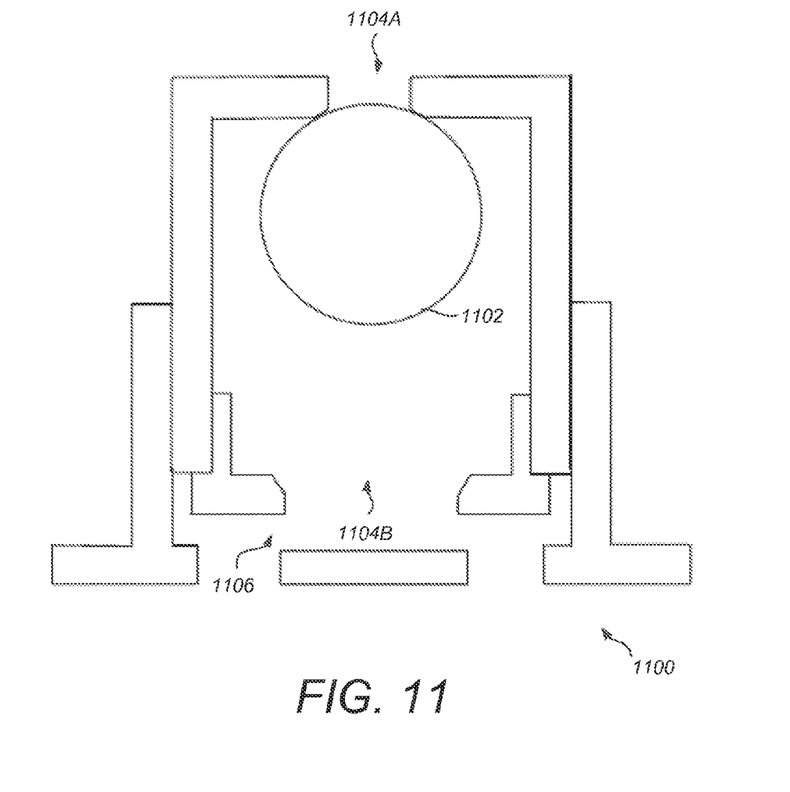
FIG. 11 shows an example of a valve with a single floating ball.

FIG. 112 shows an example of a valve 1100 with a single floating ball 1102. The valve uses upper and lower seals 1104A-B, respectively. The ball normally rests against the seat of the lower seal 1104B. If the container is submersed (i.e., liquid approaches the valve from the outside), the liquid causes the single floating ball to float up against the seat of the upper seal 1104A, as currently illustrated, thereby preventing liquid ingress. In case of internal flooding, liquid will enter the valve 1100 through the upper seal 1104A and float the ball, thereby opening a port that allows the liquid to drain out at the bottom.

In some implementations, a dissolving cover could also be used. For example, the dissolving barrier can be made of polyvinyl alcohol or a similar substance. At its bottom, the valve 1100 has a tortuous path 1106 that can help prevent debris and liquid splashes from entering the enclosure.

Figure 12:
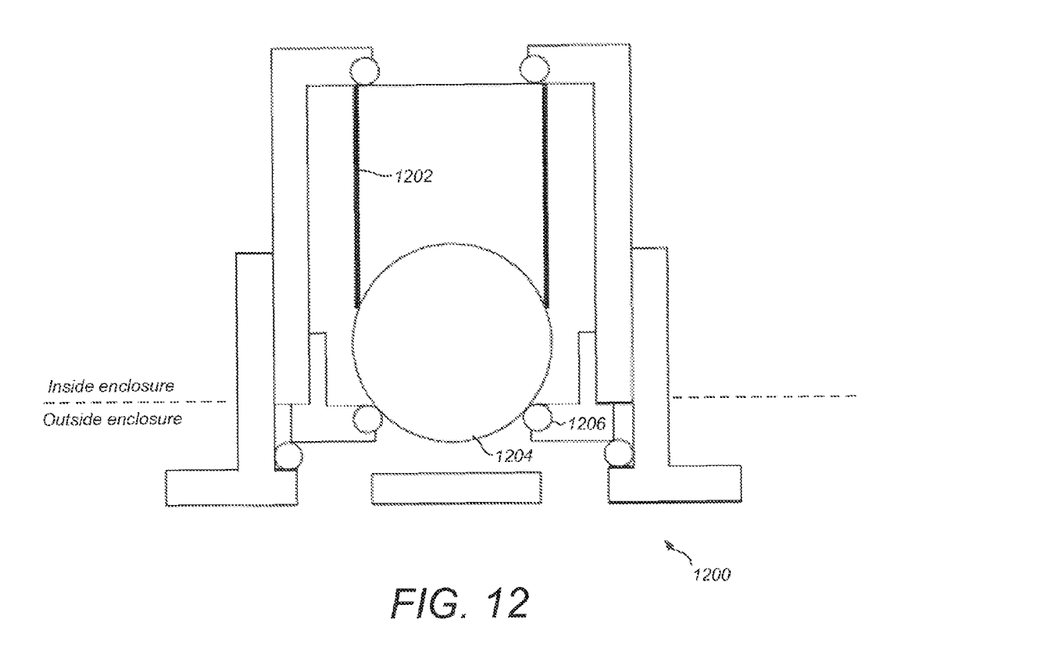
FIG. 12 shows an example of a valve with a soluble structure.

FIG. 12 shows an example of a valve 1200 with a soluble structure 1202. In some implementations, the soluble structure in its normal state biases a floating ball 1204 against one or more seals 1206 (e.g., a gasket) of the valve. For example, the soluble structure can include a tube or roll (e.g., of water soluble paper), of which one end abuts the ball and the other end abuts an interior surface of the valve.

In some implementations, the soluble structure 1202 keeps the ball 1204 pressed against the seal 1206 during vibrations and light external splashes or floods. The soluble structure and the ball resist liquid ingress from the outside. A protective cover (e.g., as described earlier herein) could be provided over the external opening of the valve to present a tortuous path to possible contaminants.

Figure 13:
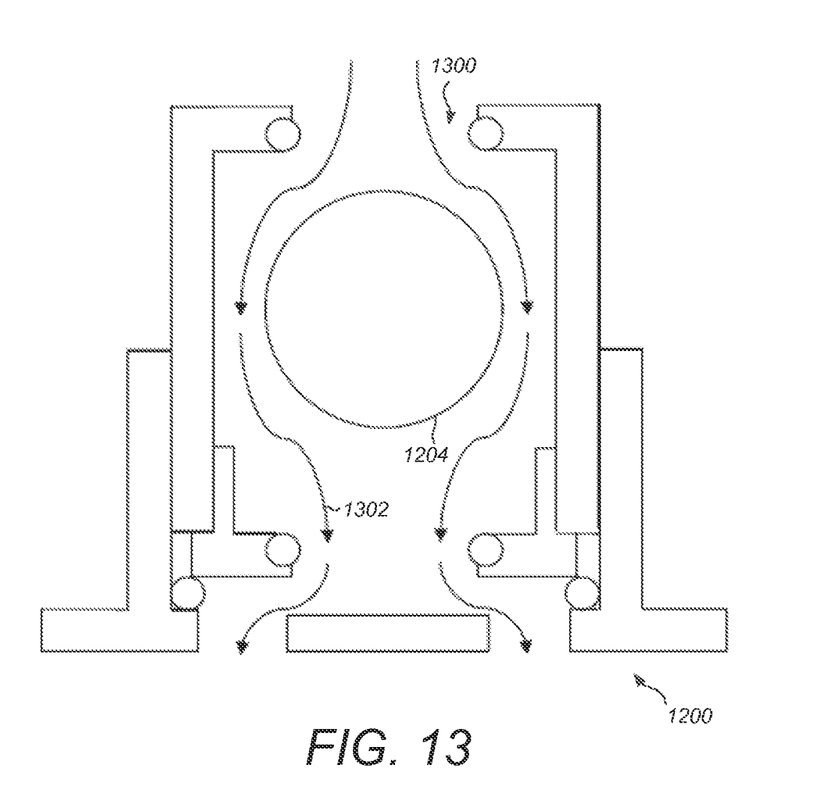
FIG. 13 shows another example of the valve in FIG. 12.

In the event of an internal flooding (e.g., due to leaking coolant) the soluble structure 1202 reacts to the liquid and dissolves into solution, in whole or in part. FIG. 13 shows another example of the valve 1200 in FIG. 12. Here, the soluble structure has dissolved and is no longer visible. Moreover, liquid from the internal flooding is entering the valve through an opening 1300, as schematically illustrated by flow arrows 1302.

This causes the floating ball 1204 to be buoyed away from the bottom seal of the valve. As a result, the liquid can pass through the bottom opening and thereby be removed from the enclosure. That is, the floating ball opens a port that allows liquid to drain. After the liquid is drained from the interior, the floating ball can again assume its position against the bottom seal of the valve, for example similar to the situation in FIG. 12, with the difference that the soluble structure is no longer intact or even present at such a stage. Nevertheless, the contact between the floating ball and the bottom seal can prevent ingress of contaminants such as gas or debris into the enclosure.

Figure 14:
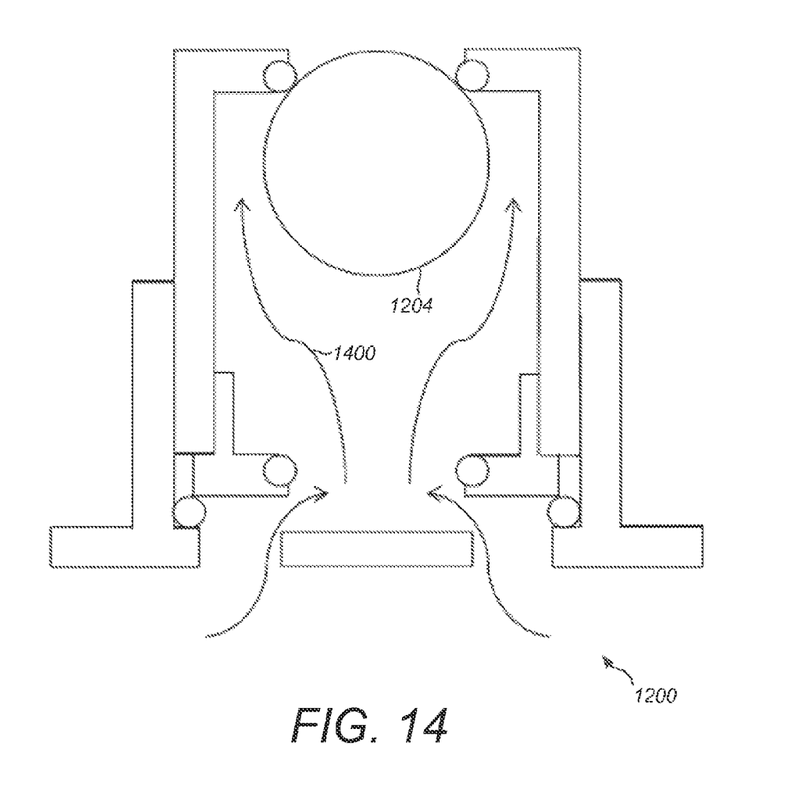
FIG. 14 shows another example of the valve in FIG. 12.

Even if the soluble structure has ruptured or vanished (e.g., as a result of internal flooding, or due to a relatively high pressure from the external liquid) the valve can still seal the enclosure against external flooding. FIG. 14 shows another example of the valve 1200 in FIG. 12. Here, a liquid has entered the lower part of the valve, as schematically indicated by flow arrows 1400. This causes the floating ball 1204 to be buoyed toward a seal at the top of the valve. As a result, the liquid is prevented from entering the enclosure by the blocking of the top opening. That is, the floating ball resists liquid ingress from the outside.

Figure 15A:
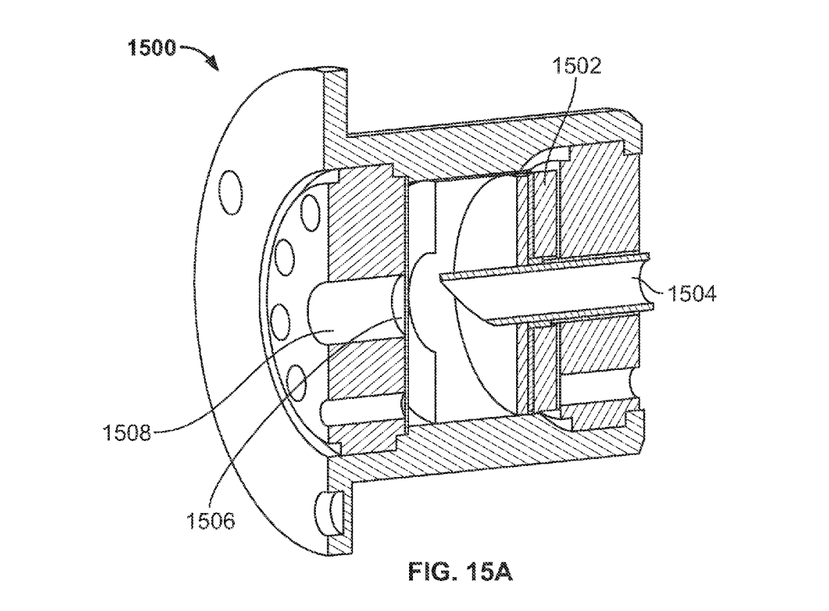
FIGS. 15A-B show a device, having an absorbent material, in respective dry and expanded states.
Figure 15B:
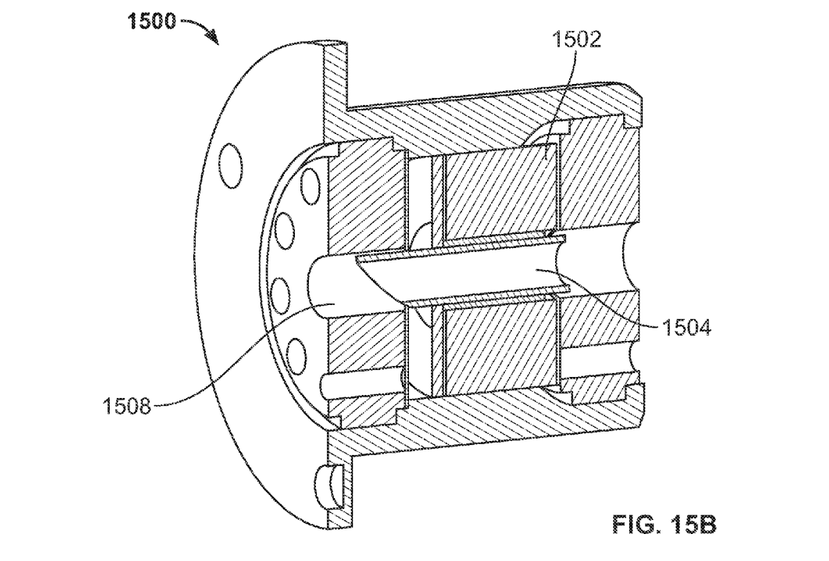

In some implementations, the expansion of a fluid-absorbent material can be used in one or more ways. FIGS. 15A-B show a device 1500, having an absorbent material 1502, in respective dry and expanded states. A hollow needle 1504 is attached to a plunger that abuts the absorbent material. The hollow needle and the plunger together form a moveable component. In FIG. 15A, the device also has a membrane 1506 that currently seals a port 1508.

When the absorbent material 1502 is exposed to a fluid, it swells and pushes on the moveable component, causing the component to move. In this example, this motion causes the hollow needle to puncture the membrane 1506 such that the port 1508 is opened. FIG. 15B shows the device 1500 in the expanded state. That is, the pierced membrane allows passage of fluid through the device.

The device 1500 can be manufactured from any materials suitable for the respective purposes of its components. For example, the body of the device can be molded from a polymer and the absorbent material can include any substance that swells or expands a significant amount (e.g., to exert the necessary force on the hollow needle) upon contact with one or more liquids. The membrane can be made of any material that withstands debris and environmental fluctuations, yet can be pierced by the hollow needle.

The force and/or motion from the absorbent material can be used for one or more purposes. Piercing a membrane was mentioned above. Other purposes include, but are not limited to, pressing or releasing a contact switch, releasing a spring or spring loaded device, pushing open a seal, such as an O-ring or radial seal, and causing a component to move for visual inspection (colored dots behind a clear window).

Figure 16:
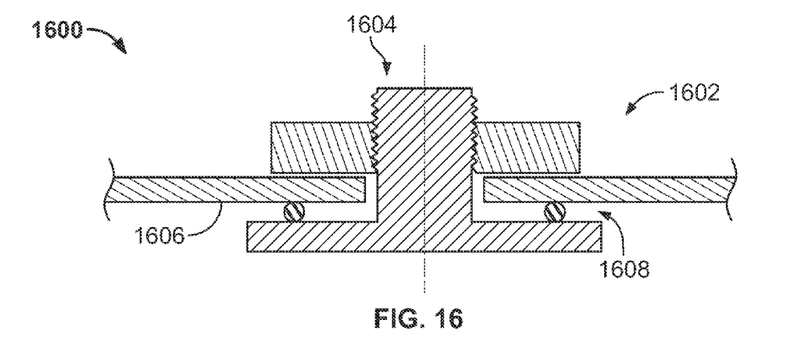
FIG. 16 shows an example of a drain device having a nut of a dissolvable material.

FIG. 16 shows an example of a drain device 1600 having a nut 1602 of a dissolvable material. The nut has interior threads and is currently fitted onto a threaded stud 1604 which passes through a port in an enclosure wall 1606. An environmental seal 1608 (e.g., a gasket or an O-ring) is provided between a head of the stud and the outside surface of the enclosure wall. That is, the dissolvable nut opens the port in response to a liquid contacting the drain device on the inside of the enclosure. The environmental seal resists ingress into the enclosure by a liquid that contacts the drain device on the outside of the enclosure.

Figure 17:
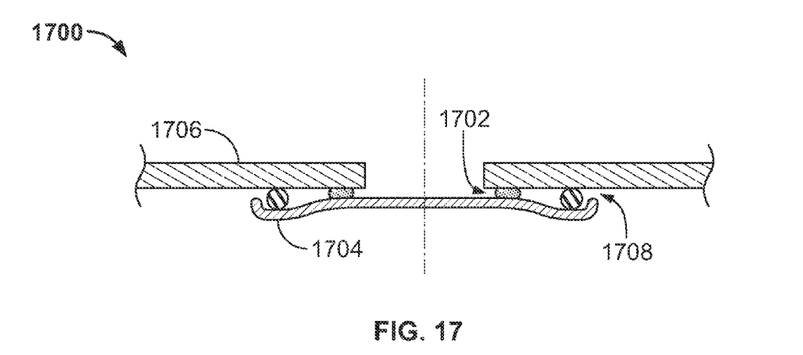
FIG. 17 shows an example of a drain device having a dissolving or reacting adhesive.

FIG. 17 shows an example of a drain device 1700 having a dissolving or reacting adhesive 1702. A lid 1704 currently covers a port in an enclosure wall 1706. An environmental seal 1708 (e.g., a gasket or an O-ring) is provided between the lid and the outside surface of the enclosure wall. That is, the dissolving or reacting adhesive opens the port in response to a liquid contacting the drain device on the inside of the enclosure. The environmental seal resists ingress into the enclosure by a liquid that contacts the drain device on the outside of the enclosure.

Figure 18:
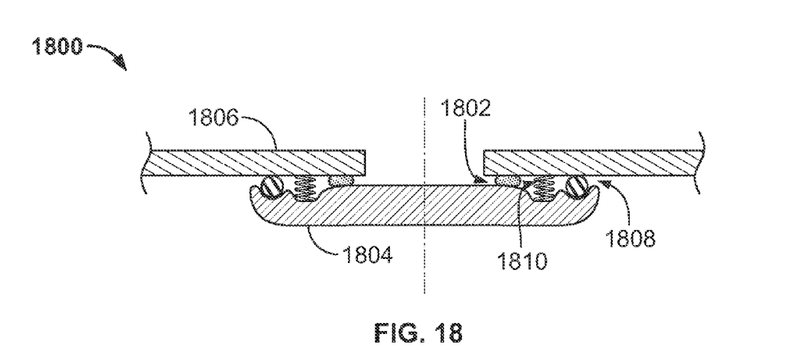
FIG. 18 shows another example of a drain device having a dissolving adhesive.

FIG. 18 shows another example of a drain device 1800 having a dissolving or reacting adhesive 1802. A lid 1804 currently covers a port in an enclosure wall 1806. An environmental seal 1808 (e.g., a gasket or an O-ring) is provided between the lid and the outside surface of the enclosure wall. Here, a biasing member 1810 (e.g., a compressed spring) is provided between the lid and the enclosure wall. In this example, the biasing element is located between the adhesive and the seal; in other implementations, the biasing element can be located inside the adhesive or outside the seal.

That is, the dissolving or reacting adhesive 1802 causes the biasing member 1810 to open the port in response to a liquid contacting the drain device 1800 on the inside of the enclosure. The environmental seal 1808 resists ingress into the enclosure by a liquid that contacts the drain device on the outside of the enclosure.

A number of implementations have been described as examples. Nevertheless, other implementations are covered by the following claims.

What is claimed is:

1. A drain device comprising:
   a body with a port therethrough, the body configured to be positioned in a wall of a container;
   means for opening the port in response to a first liquid contacting the drain device on an inside of the container; and
   means for resisting ingress into the container by a second liquid that contacts the drain device on an outside of the container;
   wherein the means for opening the port and the means for resisting ingress comprise:
      a valve member extending at least partly through the port, the valve member configured to assume at least a first position in which the port is closed, and a second position in which the port is open;
      a biasing element that biases the valve member toward the second position;
      a dissolvable element that prevents the valve member from assuming the second position, wherein when the first liquid contacts the dissolvable element, the first liquid at least partly dissolves the dissolvable element and the valve member assumes the second position; and
      a deformable member, wherein the dissolvable element causes elastic deformation of the deformable member to block the valve member from assuming the second position, and wherein when the first liquid at least partly dissolves the dissolvable element the elastic deformation is reversed so that the valve member assumes the second position.

2. The drain device of claim 1, further comprising an O-ring on at least one of the valve member and the body, wherein in the first position the O-ring seals between the valve member and the body, and in the second position the O-ring does not seal between the valve member and the body.

3. The drain device of claim 1, further comprising threads for threading the body to the wall.

4. The drain device of claim 1, wherein the body has an opening facing toward an outside of the wall, the opening having an undulating shape and being larger than the means for resisting ingress.

5. The drain device of claim 1, wherein the valve member comprises a disc and an opposing end connected to each other by a stem.

6. The drain device of claim 5, wherein the opposing end and the stem are connected to each other by a threaded connection.

7. The drain device of claim 5, wherein the body has an annular projection surrounding the port, the annular projection forming a pocket that holds the biasing element.

8. The drain device of claim 7, further comprising an O-ring that seals between the stem and an inside of the annular projection.

9. The drain device of claim 5, wherein the stem is narrower than the disc and the opposing end.

10. The drain device of claim 1, wherein the valve member comprises a cap that partially surrounds the deformable member and the dissolvable element.

11. The drain device of claim 10, wherein the cap is configured to abut the body when the valve member assumes the second position.

12. The drain device of claim 11, further comprising openings in the cap.

13. The drain device of claim 1, wherein the valve member extends through the dissolvable element.

14. A system comprising:
a battery system;
a cooling system configured to cool at least part of the battery system with a liquid coolant; and
a self-activating drain device in an exterior wall of the system, the self-activating drain device comprising:
a body with a port therethrough;
a valve member configured to assume at least open and closed positions, the valve member biased toward the open position;
a dissolvable element that prevents the valve member from assuming the open position, wherein when the liquid coolant contacts the dissolvable element, the liquid coolant at least partly dissolves the dissolvable element and the valve member assumes the open position; and
a deformable member, wherein the dissolvable element causes elastic deformation of the deformable member to block the valve member from assuming the open position, and wherein when the liquid coolant at least partly dissolves the dissolvable element the elastic deformation is reversed so that the valve member assumes the open position.

15. The system of claim 14, further comprising an O-ring on at least one of the valve member and the body, wherein in the closed position the O-ring seals between the valve member and the body, and in the open position the O-ring does not seal between the valve member and the body.

16. The system of claim 14, wherein the system is configured to have a dry zone and a wet zone, with the battery system being located in the dry zone and the cooling system and the self-activating drain device being located in the wet zone.

17. The system of claim 16, wherein the cooling system being located in the wet zone comprises points of the cooling system that are vulnerable to crash abuse being located in the wet zone.

18. The system of claim 14, further comprising a detector configured to detect activation of the self-activating drain device.

19. The system of claim 18, wherein the detector comprises a switch that closes or is opened by movement of a component of the self-activating drain device.

20. The system of claim 18, wherein the detector comprises a chemically or electrically sensitive component that registers presence of the liquid coolant.

21. A method of managing leakage of liquid inside a battery system, the method comprising:
containing leaking liquid in a non-liquid sensitive region of the battery system so as to protect internal electrical components of the battery system from coming in contact with the leaking liquid; and
in direct response to the leakage, expunging the leaking liquid from the battery system;
wherein the leaking liquid is expunged using a self-activating drain device comprising:
a body with a port therethrough;
a valve member configured to assume at least open and closed positions, the valve member biased toward the open position;
a dissolvable element that prevents the valve member from assuming the open position, wherein when the leaking liquid contacts the dissolvable element, the leaking liquid at least partly dissolves the dissolvable element and the valve member assumes the open position; and
a deformable member, wherein the dissolvable element causes elastic deformation of the deformable member to block the valve member from assuming the open position, and wherein when the leaking liquid at least partly dissolves the dissolvable element the elastic deformation is reversed so that the valve member assumes the open position.

22. The method of claim 21, further comprising:
generating a leakage detection signal in direct response to the leakage.

23. The method of claim 22, further comprising:
performing at least one action in response to the leakage detection signal.

24. The method of claim 23, wherein the action is performed in the battery system.

* * * * *